United States Patent
Hood et al.

(10) Patent No.: US 9,657,125 B2
(45) Date of Patent: May 23, 2017

(54) REACTIVE MONOMER FOR A COATING AND/OR REACTIVE COATING

(75) Inventors: David K. Hood, Basking Ridge, NJ (US); Osama M. Musa, Kinnelon, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 696 days.

(21) Appl. No.: 13/521,471

(22) PCT Filed: Jan. 7, 2011

(86) PCT No.: PCT/US2011/020447
§ 371 (c)(1),
(2), (4) Date: Aug. 29, 2012

(87) PCT Pub. No.: WO2011/085150
PCT Pub. Date: Jul. 14, 2011

(65) Prior Publication Data
US 2012/0312191 A1    Dec. 13, 2012

Related U.S. Application Data

(60) Provisional application No. 61/293,824, filed on Jan. 11, 2010.

(51) Int. Cl.
*C09D 4/02*       (2006.01)
*C09D 11/101*     (2014.01)
*C08F 226/06*     (2006.01)
*C09D 133/14*     (2006.01)
*C08F 226/10*     (2006.01)

(52) U.S. Cl.
CPC .......... *C08F 226/06* (2013.01); *C09D 11/101* (2013.01); *C09D 133/14* (2013.01); *C08F 226/10* (2013.01)

(58) Field of Classification Search
None
See application file for complete search history.

(56) References Cited

U.S. PATENT DOCUMENTS

| | | |
|---|---|---|
| 2002/0185035 A1 | 12/2002 | Kitagawa |
| 2004/0066438 A1 | 4/2004 | Taguchi et al. |
| 2004/0242727 A1 | 12/2004 | Carlson et al. |
| 2008/0306193 A1 | 12/2008 | Allen et al. |
| 2009/0083911 A1 | 4/2009 | Holmes |
| 2010/0086701 A1 | 4/2010 | Iftime et al. |

FOREIGN PATENT DOCUMENTS

| | | |
|---|---|---|
| WO | WO 2010/104837 | 9/2010 |
| WO | WO2010104837 A1 | 9/2010 |

OTHER PUBLICATIONS

STN Registry entry for CAS RN 911793-59-4, Entered STN Registry Nov. 1, 2006, Accessed Oct. 22, 2014.*
"Coatings." Farlex Partner Medical Dictionary. 2012. Farlex, Obtained Mar. 3, 2015 <http://medical-dictionary.thefreedictionary.com/Coatings>.*
Thibault et al., American Chemical Society 2006, 128, 12084-12085 and Supplemental Material.*
Thibault et al., A Versatile New Monomer Family: Functionalized 4-Vinyl-1,2,3-Triazoles via Click Chemistry. Journal of the American Chemical Society [online], Sep. 2006 [Retrieved on Feb. 24, 2011], vol. 128, Iss 37, pp. 12084-12085; retrieved from the Internet:,URL:http://pubs.acs.org/>.
International Search Report, PCT/US2011/020447 published on Sep. 16, 2010.

* cited by examiner

*Primary Examiner* — Alicia L Otton
(74) *Attorney, Agent, or Firm* — William J. Davis

(57) ABSTRACT

Disclosed herein are coating solutions comprising a reactive monomer, process and compositions for preparing the same that are suitable for a coating and/or reactive coating. More particularly, the present invention relates to monomers of functionalized 4- or 5-vinyl substituted regioisomers of 1,2,3-triazoles comprising a polymerizable functionality and their use in coatings. Also disclosed are applications and compositions comprising coating solutions of a reactive monomer and its application in printing processes and inks.

12 Claims, No Drawings

REACTIVE MONOMER FOR A COATING AND/OR REACTIVE COATING

FIELD OF THE INVENTION

The present invention relates to coating solutions comprising a reactive monomer, and processes and compositions for preparing the coating solution that are suitable for a coating and/or reactive coating. More particularly, the present invention relates to monomers of functionalized 4- or 5-vinyl substituted regioisomers of 1,2,3-triazoles comprising a polymerizable functionality and their use in coatings. Also disclosed are applications and compositions comprising coating solutions of a reactive monomer and its application in printing processes and inks.

BACKGROUND OF THE INVENTION

Commercial printing processes are dominated by lithography, flexography, letterpress, screen printing and electrophotographic printing. Rapidly evolving technologies for sublimation/melt-type printing and ink-jet are becoming more commercially attractive processes. Increasing in influence of these printing technologies is curable ink systems.

A distinguishing feature of printing ink is its visual appearance. The color, transparency, intensity or density, and gloss often determine the suitability of the ink for a particular application. Another distinguishing feature of printing ink is its adhesion to surfaces, resistance to scratching and defacement, impact resistance, resistance to heat, resistance to solvents or other media, lightfastness, UV stability, and flexibility.

In many printing processes, once these challenges are met, the ink is then evaluated for suitability for color matching. Color matching often requires the use of one colored ink in concert with other different colored inks. In one example, International Commission on Illumination (CIE) color matching provides for an increase in the color spectrum though a process of mixing primary colors (red, green, and blue) to produce secondary colors (cyan, magenta, yellow) and myriads of possibilities between them. For such a system to function properly, the ink must be compatible, not only in physical/chemical properties, but in color properties too.

There are many raw materials employed in the manufacturing of ink products. The four basic components of a printing ink are pigments and dyes, resins, solvents, and additives. These components can be broken down into further details covering potential ingredients such as pigments and dyes, oils, resins, solvents, plasticizers, waxes, driers, chelating agents, anti-oxidants, surfactants, deodorants and fragrances, defoaming agents, adhesion promoters, photoinitiators, reactive diluents, oligomers, inhibitors, and laking agents. Not all of these ingredients will be used for all inks and some ingredients are capable of serving more than one purpose.

Viscosity is a key element to the physical properties and commercial performance capabilities of an ink system. As indicated in the Kipphan's Handbook of Print Media: Technologies and Production Methods (Springer Verlag, New York, 2001) and Leach and Pierce's Printing Ink Manual (Kluwer, Boston, 1999) typical ranges of viscosity are presented below in Table 1.

TABLE 1

Typical Viscosity Ranges for Various Printing Processes

| Printing Process | Typical Viscosity Range (Pa*s) |
|---|---|
| Lithography | 2 to 30 |
| Offset | 40 to 100 |
| Letterpress | 50 to 150 |
| Sublimation and Melt-Type printing | solid at room temperature and melts at elevated temperature |
| Electrophotographic | ~0.1 to 10, for liquid toner Solid, for dry toner |
| Flexography | 0.05 to 0.5 |
| Gravure | 0.01 to 0.2 |
| Screen | 1.5 to 2.0 or higher |
| Ink-jet | ~0.001 to 0.1 |
| Intaglio | 9 to 25 |

Typical techniques for measuring the viscosity of an ink system include capillary viscometers, falling sphere viscometers, flow cups (i.e., Zahn, Shell and Ford), rotational viscometers, cone and plate viscometers (i.e., Haake, TA Instruments), controlled stress rheometers, falling bar viscometers and the like.

As printing speeds become faster and materials more specialized, certain aspects of the printing process have evolved. For example, in some printing press applications, it is not uncommon to employ substrates that are pre-treated, by providing a primer coating to enable adhesion to the surface or surface treating with corona or flame, thereby enabling good ink performance on the substrate despite the added cost in materials and/or production time.

Printing technologies are applied to many different surfaces. For example, polyester film, polyolefin film (PE and PP), polycarbonate, polyimide film, metals (i.e., aluminum, steel, copper), glass, vinyl film, Tyvec, canvas, polyvinylidene chloride films, paper, polyurethane, ceramics, wood, textiles, and the like.

In curable ink systems, the polymerization process can be initiated by thermal effects or irradiation (α, γ, and x-rays, UV, E-beam, and the like).

Chemical monomers may be used in an ink system to improve the characteristics of the system. Among the properties that can be beneficially impacted by monomers are solution viscosity, cure speed, adhesion, impact resistance, toughness, coating hardness, surface tension, wetting, foaming, tensile strength, solvency, dispersive properties, flexibility, chemical resistance, abrasion resistance, and penetration.

Monomers of functionalized 4- or 5-vinyl substituted regioisomers of 1,2,3-triazoles comprising a polymerizable functionality are provided and are represented by the following structure:

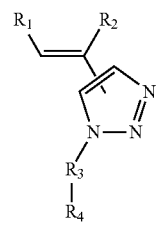

wherein $R_1$, $R_2$, and $R_3$ are independently selected from the group consisting of hydrogen, substituted alkyl, unsubstituted alkyl, cycloalkyl, alkenyl, and aryl groups, wherein any of the before mentioned groups may be with or without heteroatoms; and $R_4$ is selected from the group consisting of a direct bond, carboxylic acids, esters, amides, anhydrides, aldehydes, ketones, ethers, amines, alcohols, and thiols; with the proviso that when $R_4$ is hydrogen, $R_3$ is a direct bond.

Given the many requirements and challenges for reactive materials in ink applications, there is a constant need for a new reactive monomers. In one embodiment, the present invention is directed to energy curable, reactive monomers containing —C=C— functionalities.

SUMMARY OF THE INVENTION

The present invention relates to reactive solutions comprising a reactive monomer and process and compositions for preparing the same, which are suitable as coatings, reactive coatings, and in ink. In one embodiment, monomers of the present invention relate to monomers of functionalized 4- or 5-vinyl substituted regioisomers of 1,2,3-triazoles comprising a polymerizable functionality. Also disclosed are compositions comprising reactive solutions of the described monomers and its applications in coatings, reactive coatings and inks.

DETAILED DESCRIPTION OF THE INVENTION

The term "reactive monomer" throughout the specification and the claims is defined as a material comprising a carbon-carbon double bond. When activated by means known in the art, the carbon-carbon double bond reacts with other carbon-carbon double bonds to form a polymeric material.

The term "curing" throughout the specification and the claims refers to the process of polymerizing, e.g., converting a liquid to a solid, by exposing a material to appropriate energy source which is capable of curing. The resulting cured product is incapable of demonstrating a molecular weight as determined by gel permeation chromatography (GPC).

The term "lithography" throughout the specification and the claims refers to a printing process that employs a flat printing plate. The printable area is usually ink-receptive while the non-printable area repels ink.

The term "flexography" throughout the specification and the claims refers to a relief printing process. This process employs rubber or photopolymer plates and an ink system. Typically, printing is achieve via transfer of the ink from an anilox roller.

The term "letterpress" throughout the specification and the claims refers to a relief printing process employing rubber or photopolymer plates and an ink system. Typically, printing is achieve via transfer of the ink from a roller and pressed into contact with the substrate.

The term "screen printing" throughout the specification and the claims refers to a stencil printing process. A rubber squeegee is employed to push ink through a stencil onto a substrate.

The term "ink-jet" throughout the specification and the claims refers to a computer controlled stream of ink droplets, ejected at high speed, onto a printing surface.

The term "electrophotographic" throughout the specification and the claims refers to a printing process whereby light is used to selectively discharge an electrostatic field, forming an electrostatically charged image. Toner of a proper charge is then transfer to the substrate and fused to the surface by heat or other process.

Monomers of functionalized 4- or 5-vinyl substituted regioisomers of 1,2,3-triazoles comprising a polymerizable functionality are provided and are represented by the following structure:

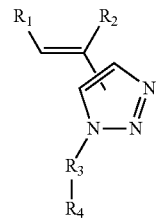

wherein $R_1$, $R_2$, and $R_3$ are independently selected from the group consisting of a direct bond, hydrogen, substituted alkyl, unsubstituted alkyl, cycloalkyl, alkenyl, and aryl groups, wherein any of the before mentioned groups may be with or without heteroatoms; and $R_4$ is selected from the group consisting of hydrogen, carboxylic acids, including carboxyl groups, esters, amides, including amido and carboamido groups, anhydrides, aldehydes, ketones, including alkylcarboxyalkyl groups, ethers, amines, including amino, alkylamino, and dialkylamino groups, alcohols, including hydroxyalkyl groups, and thiols; with the proviso that when $R_4$ is hydrogen, $R_3$ is a direct bond. The polymerizable functionality can be the 4- or 5-vinyl group and/or provided by a substituent at positions $R_1$, $R_2$, or $R_3$, for example, an alkenyl. In one embodiment, the present invention is directed to energy curable, reactive monomers containing —C=C— functionalities. The triazole monomers may be synthesized as described in WO/2010/104837 (the contents of which are hereby incorporated by reference).

In one embodiment, the monomer is 1-octyl-4-(prop-1-en-2-yl)-IH-1,2,3-triazole, as shown below:

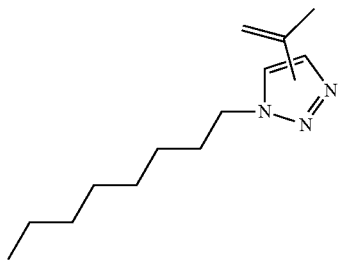

In another embodiment, the monomer is N,N-dimethyl-2-(1H-1,2,3-triazol-1-yl)ethanamine with a 2-methylprop-1-ene, as shown below:

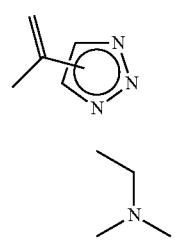

In one embodiment, a reactive monomer of the present invention is provided as a reactive solution. In another embodiment, a reactive monomer of the present invention is provided with additional reactive compound(s). These additional reactive compounds may consist of (meth)acryl monomers or pre-polymers, a (meth)acryl ester of an epoxy type monomer or pro-polymer, and/or a urethane type monomers or pro-polymers.

Examples of additional reactive compounds include but are not limited to 2-hydroxy methyl methacrylate (HEMA), 2-hydroxy ethyl acrylate (HEA), 2-phenoxy ethyl acrylate (PHEA), 2-ethylhexyl-diglycol acrylate, 2-(2-ethoxyethoxy) ethyl acrylate (EOEOEA), lauryl acrylate (LA), Stearyl acrylate (SA), isobornyl acrylate (IBOA), acrylic acid-2-ethylhexyl ester, isodecyl acrylate, acryloyl morpholine (ACMO), cyclic trimethylol-propane formal acrylate (CTFA), 3-(Methacryloylamino)propyl]trimethylammonium chloride (MAPTAC), (3-Acrylamidopropyl)trimethyl-ammonium chloride (APTAC), C8-C10 acrylate (ODA), isodecyl acrylate (ISODA), lauryl methacrylate (LM), stearyl methacrylate (SM), 2,2,2-Trifluoroethyl methacrylate, 2-Acrylamido-2-methyl-1-propanesulfonic acid, 2-Acrylamido-2-methyl-1-propanesulfonic acid sodium salt, [2-(Methacryloyloxy)ethyl]dimethyl-(3-sulfopropyl) ammonium hydroxide, [3-(Methacryloylamino)propyl]dimethyl(3-sulfopropyl)ammonium hydroxide inner salt, 1,6-hexanediol diacrylate (HDDA), dipropylene glycol diacrylate (DPGDA), tripropylene glycol diacrylate (TPGDA), 1,4-butanediol diacrylate (BDDA), Tripropylene glycol diacrylate (TPGDA), dipropyleneglycol diacrylate (DPGDA), Tripropylene glycol diacrylate (TRPGDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG (200)DA), polyethylene glycol (400) diacrylate (PEG(400) DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), glycerol propoxylated triacrylate (GPTA), diethylene glycol dimethacrylate (DEGDMA), ethoxylated bisphenol-A dimethacrylate (BPA10EODMA), trimethylolpropane triacrylate (TMPTA), pentaerythritol triacrylate (PET3A), ethoxylated tri-methylolpropane triacrylate (TMP3EOTA), propxylated tri-methylolpropane triacrylate (TMP3POTA), propoxylated glyceryl triacrylate (GPTA), trimethylolpropane trimethylacrylate (TMPTMA), ethoxylated trimethylolpropane trimethacrylate (TMP3EOTMA), 2,2-dionol diacrylate, pentaerythritol tetraacrylate (PETA), neopentylglycol diacrylate hydroxypivalate, 2-acryloyloxyethylphthalic acid, 2-acryloyloxyethyl-2-hydroxyethylphthalic acid, dimethyloltricyclodecane diacrylate, 2-acryloyloxyethylsuccinic acid, nonylphenol ethylene oxide adduct acrylate, methoxy-polyethylene glycol acrylate, tetramethylolmethane triacrylate, dipentaerythritol hexaacrylate (DPHA), isocyanate-functional unsaturated acrylic ester resin, urethane diacrylates oligomers, urethane acrylates, modified urethane acrylates, polyester acrylates, modified bisphenol A diacrylate, phenoxy-polyethylene glycol acrylate, bisphenol A propylene oxide modified diacrylate, bisphenol A ethylene oxide adduct diacrylate, pentaerythritol triacrylate hexamethylenediisocyanate, urethane prepolymer, isoamyl acrylate, isomyristyl acrylate, isostearyl acrylate, carbitol acrylate, cyclohexyl acrylate, tetrahydrofurfuryl acrylate, 1,4-butane-diol-monoacrylate and/or diglycidyl ether of 1,4-butanediol, and the like.

In one embodiment, a mixture of reactive monomers of the present invention and additional monomers are also envisioned.

Additional examples of additional monomers include methyl vinylether, ethyl vinylether, propyl vinylether, n-butyl vinylether, t-butyl vinylether, 2-ethylhexyl vinylether, n-nonyl vinylether, lauryl vinylether, cyclohexyl vinylether, cyclohexylmethyl vinylether, 4-methylcyclohexylmethyl vinylether, benzyl vinylether, dicyclopentenyl vinylether, 2-dicyclopentenoxyethyl vinyl ether, methoxyethyl vinylether, ethoxyethyl vinylether, butoxyethyl vinyl ether, methoxyethoxy vinylether, ethoxyethoxyethyl vinylether, methoxypolyethylene glycol vinylether, tetrahydrofurfuryl vinylether, dodecyl vinylether, diethylene glycol monovinylether, 2-hydroxyethyl vinylether, 2-hydroxypropyl vinylether, 4-hydroxybutyl vinylether, 4-hydroxymethylcyclohexylmethyl vinylether, polyethylene glycol vinylether, chloroethyl vinylether, chlorobutyl vinylether, phenylethyl vinylether, phenoxypolyethylene glycol vinylether, ethylene glycol divinylether, butylenes glycol divinylether, hexandiol divinylether, bisphenol A alkyleneoxide divinylethers, bisphenol F alkyleneoxide divinylethers, propyleneoxide adducts of trimethylolpropane trivinylether, triethylene glycol divinylether, cyclohexane dimethanol divinylether, N-vinyl-2-pyrrolidone (VP), N-vinyl caprolactam (VCap), N-vinyl imidazole (VI), n-vinyl amides, 4-vinyl pyridine, 2-vinyl pyridine, styrene, 5-vinyl-2-norbornene and the like.

Non-limiting examples of monofunctional epoxy compounds which may be included with the described reactive monomers include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcylcohexeneoxide, 3-acryloyloxymethylcylcohexeneoxide, 3-vinylcylcohexeneoxide, and the like.

Non-limiting examples of multifunctional epoxy compounds which may be included with the described reactive monomers include 3,4-Epoxycyclohexylmethyl-3,4-epoxycyclohexane carboxylate, 3-ethyl-3-((ethyloxetane-3-yl) methoxy) methyl)oxetane, bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl) adipate, vinylcylcohexeneoxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylene-bis(3,4-epoxycyclohexane), dicyclopentadiene diepoxide, ethylene glycol di(3,4-epoxycyclohexylmethyl) ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

The present invention relates to curing or cross-linking or polymerizing a polymerizable material as described by any appropriate method known or explored in the prior-arts by a person skilled in the art. Particularly, the polymerization of a described reactive solution comprising polymerizable materials can be carried out by employing any one of the method disclosed in "*Principles of Polymerization*" 4*th* *edition,* 2004, Wiley by George Odian and is referred and disclosed herein in its entirety. In various embodiments, techniques or methods employed to polymerize the described compositions include UV-radiation, UV-LED, laser beam, electron beam, gamma irradiation, free-radical, cationic, anionic, thermal, exposure to e-beam and/or by employing a high-energy source in presence of suitable photo initiator for the initiation of polymerization. A suitable source of radiation includes but is not limited to mercury, xenon, halogen, carbon arc lamps, sunlight, and radioactive sources.

In order to induce polymerization by irradiation, an appropriate photoinitiator(s) may be used. In one embodiment, the photoinitiator has high storage stability after being added, and may be incorporated to initiate the polymerization reaction system. Examples of suitable photoinitiators include but are not limited to the following group or class of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis[4-diphenylsulfonio]phenyl)sulfide bis (hexafluoroantimonate and diphenyl-4-thiophenoxyphenyl-sulfonium hexafluoroantimonate, bis[4-(di(4-(2-hydroxy-ethyl)phenyl)sulfonio)phenyl sulfide], 5-2,4-cyclopentadiene-1-yl-[(1,2,3,4,5,6-.eta.)-(1-methylethyl-)benzene]-iron (1+)-hexafluorophosphate(1−)), 4-(2-hydroxytetradecanyloxy) diphenyliodonium hexafluoroantimonatc, (4-hydroxynaphtyl) dimethylsulfo-nium hexafluoroantimonate), triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis (hexafluorophosphate)), Aryldiazonium salts, diaryliodonium salts, triaylsulfonium salts, triarylselenonium salts, dialkylphenacylsulfonium salts, triarylsulfoxonium salts, aryloxydiarylsulfonium salts, and the like for example, triphenylsulfonium hexaflurophosphate, methyldiphenylsulfonium hexafluorophosphate, dimethylphenyl-sulfonium hexaflurophosphate, diphenyinapththylsulfonium hexaflurophosphate, di(methoxynapththyl)methylsulfonium hexaflurophosphate, (4-octyloxyphenyl) phenyl iodonium hexafluoro antimonate, (4-octyloxyphenyl) diphenyl sulfo-nium hexafluoro antimonate, (4-decyloxyphenyl) phenyl iodonium hexafluoro antimonite, (4-dodecyloxyphenyl)di-phenyl sulfonium hexafluoroantimonate. Particularly, employed photoinitaitors include 10-biphenyl-4-yl-2-iso-propyl-9H-thixanthen-10-ium hexafurophosphate, 4,4'-dim-ethyl iodonium hexaflurophosphate, mixed triarylsulfonium hexaflurophosphate salts and reaction products of polyol and 10-(2-carboxymethoxy)-biphenyl-4yl-2-isopropyl-9-oxo-9H-thioxanthen-10-ium hexaflurophosphate. Further, these photoinitiators may be used alone or in combinations thereof. Alternatively, if desired, the photoinitiator may be used by mixing it with one or more photopolymerization accelerator, such as a benzoic acid (e.g., 4-dimethylamin-obenzoic acid) or a tertiary amine, in any appropriate ratio. In one embodiment, the photoinitiator is added to the photopolymerizable composition in the range of about 0.1% to about 20% by weight.

According to one embodiment, the polymerizable material of the present invention is reacted through free-radical polymerization in the presence of a free-radical initiator. Free-radical polymerization refers to any chemical moiety which, upon exposure to an appropriate energy source (e,g. light or heat), decomposes into independent uncharged fragments with a highly reactive unpaired electron. The free-radical initiator may include but is not limited to various derivatives of peroxides, peresters and/or azo compounds. More particularly, free-radical initiators may be selected from the group consisting of dicumyl peroxide, dibenzoyl peroxide, 2-butanone peroxide, tert-butyl perbenzoate, di-tert-butyl peroxide, 2,5-bis(tert-butylperoxy)-2,5-dimethyl-hexane, bis(tert-butyl peroxyisopropyl)benzene, and tert-butyl hydroperoxide), diacyl peroxides, cumene hydroperoxide, dialkyl peroxides, hydroperoxides, ketone peroxides, monoperoxycarbonates, peroxydicarbonates, peroxyesters, and peroxyketals, including tertiary butyl perbenzoate, tertiary butyl peroctoate in diallyl phthalate, diacctyl peroxide in dimethyl phthalate, dibenzoyl peroxide, 1-hydroxy cyclohexyl-1-phenyl ketone, bis (2,4,6-trimethyl benzoyl)phenyl phosphine, benzoin ethyl ether, 2,2-dimethoxy-2-phenyl acetophenone, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylper-oxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-di-methyl-2,5-bis(t-butyl peroxy) hexane, cumyl hydroperox-ide, diacetyl peroxide, t-butyl hydroperoxide, ditertiary butyl peroxide, 3,5-dihydroxy-3,5-dimethyl-1,2-oxacyclo-pentane, and 1,1-bis(t-butyl peroxy)-3,3,5-trimethyl cyclo-hexane and di-(4-t-butyl cyclohexyl) peroxydicarbonate, azo compounds such as azobisisobutyronitrile and azobis-cyclohexanenitrile (e.g., 2,2'-azobis(2-methyl-propaneni-trile), 2,2'-azobis(2-methylbutanenitrile), and 1,1'-azobis (cyclohexanecarbonitrile)) and the like. The free-radical initiator may be used alone or as combinations thereof. In one embodiment, a single free-radical initiator, or a combination of free-radical initiators, can be used for thermal based polymerization, where the polymerization reaction is initiated through heat energy. Particular thermal initiator employed for the polymerization include 2,2'-azobis (2,4-dimethylpentanenitrile), 2,2'-azobis (2-methylpropaneni-trile), 2,2'-azobis (2-methylbutanenitrile), peroxides such as benzoyl peroxide, and the like. In one embodiment, the thermal initiator is 2,2'-azobis(isobutyronitrile).

The structure of the polymer present in the reactive solution following polymerization can be confirmed from appropriate spectral techniques that are known in the art and include $^1$H-NMR, $^{13}$C-NMR and FT-IR spectra.

In various embodiment, additives may be included in the described composition.

In one embodiment, a colorant may be added to the described composition. The colorant can be in the form of a pigment or dye. Combinations of pigments and dyes are also envisioned. Suitable pigment materials are described in Hunger's "Industrial Organic Pigments," Itoh's "Dictionary of Pigments," and Leach and Pierce's "Printing Ink Manual." Examples of yellow colored, organic and inorganic, pigments include C.I. Pigment Yellow 1, C.I. Pigment Yellow 74, azo pigments such as C.I. Pigment 12 and C.I. Pigment Yellow 17 and the like.

Examples of black colored pigments include carbon black, titanium black, aniline black, and the like.

Examples of white colored pigments include basic lead carbonate, zinc oxide, barium sulfate, titanium oxide, silver white, strontium titanate, and the like.

Examples of red colored pigments include naphthol red (C.I. Pigment Red 2), C.I. Pigment Red 3, C.I. Pigment Red 176 and C.I. Pigment Red 23 and the like.

Examples of green colored pigments include phthalocyanine green (C.I. Pigment Green 7), C.I. Pigment Green 36, and C.I. Pigment Green 1 and the like.

Examples of blue colored pigments include phthalocyanine blue (C.I. Pigment Blue 15:3), C.I. Pigment Blue 15:6, and C.I. Pigment Blue 16 and the like.

In dispersing the pigment and/or dye properly in the described composition, dispersing machines and dispersants can be employed. Typical dispersing machines include agitators, ball mills, bead mills, colloid mill, Cowles mixer, Henschel mixer, homogenizer, jet mill, John mill, kneader, pearl mill, roll mill, sand mill, STS mill, Tex mill, ultrasonic wave homogenizer, wet jet mill and the like. Typical dispersants include carboxylic acids comprised of hydroxyl groups, long chain polyaminoamide salts with high molecular weight acid esters, high molecular weight polycarboxylic acid salts (Na and $NH_4$), alkyl pyrrolidones, the inventive monomer, high molecular weight copolymers, styrene acrylates, modified polyacrylates, polyvalent aliphatic carboxylic acids, naphthalenesulfonic acid/formalin condensates, polyoxyethylene alkylphosphoric esters, polyvinyl pyrrolidones, copolymers of vinyl pyrrolidone/vinyl acetates, alkylated polyvinyl pyrrolidones (alkylated with C4, C12, C20, C30, and the like), poly(maleic anhydride-co-methyl vinylether), poly(maleic anhydride-co-acrylic acid), copolymers of maleic anhydride, poly(tetrahydrofuran), Solsperse (Zeneca), Zetasperse Z-2100 and Z-2300 (Air Products), Surfynols (104, 111, 121, 131, 136, 171, and 231 (Air Products)), Tamol (731 and 1124 (Rohm and Haas)), Troysperse 90W (Troy), AMPS 95, BYK 346 (BYK), CETAC and the like.

Examples of blue colored dyes include Acid Blue 1, Basic Blue 1 and C.I. Solvent Blue 7 and the like.

Examples of red colored dyes include Acid Red 18, Basic Red 1 and C.I. Solvent Red 8 and the like.

Examples of green colored dyes include Acid Green 1 and Basic Green 1 and the like.

Examples of black colored dyes include C.I. Solvent Black 5 and the like.

In one embodiment, an oil, such as a drying or non-drying oil, may be added to the described composition. Examples of drying oils include glycerides or triglycerides of fatty acids. Drying oils are characterized by the presence of unsaturated —CH═CH— groups. Additional examples of oils include oils of linseed, tung, oiticica, dehydrated castor, fish, and soya bean. Examples of non-drying oils include mineral, castor, and petroleum distillates.

In one embodiment, a resin, or high molecular weight polymer, may be added to the described composition. Examples of useful resins include, acrylic polymers, polyvinylbutyral, polyurethanes, polyisocyanates, polyamides, polyesters, epoxies and polyepoxides, polyphenols, polycarbonates, polyvinylformal, shellac, vinylic, rubber based, waxes rosin, maleic resin and esters, manila copal, asphalts, starch and dextrin, gum Arabic, rosin modified phenolics, alkyds, terpenes, polystyrene, styrenic copolymers, styrene acrylates, silicone resins, alkylated urea formaldehyde resins, alkylated melamine formaldehyde resins, polyimides, poly(amide-imide) resins, chlorinated rubber, cyclized rubber, polyvinyl acetates, polyvinyl alcohols, alkylated polyvinyl alcohols, ketones resins, nitrocelluloses, ethyl cellulose, ethyl hydroxyethyl cellulose, cellulose acetate propionate, cellulose acetate butyrate, sodium carboxymethyl cellulose, polyethylene glycols and the like.

In one embodiment, a solvent may be added to the described composition. Suitable solvents can be identified in the Industrial Solvents Handbook, 4ed. edited by E. W. Flick (Noyes Daya Corp, Park Ridge, N.J., 1991). Additional insight to solvent selection is also available in the *Polymer Handbook*, 4ed. edited by J. Brandrup, E. H. Immergut, and E. A. Grulke (John Wiley, New York, 1999), which also describes Solubility Parameters Values. These references are understood to be incorporated in their entirety.

Examples of useful solvents include hydrocarbon solvents (i.e., white spirit and paraffin oils, low and high boiling), aromatic hydrocarbons (toluene, xylene, paraffins, and naphthenes), alcohols (ethanol, n-propyl, isopropyl, n-butyl), alicyclic alcohols (cyclohexanol), glycols (monoethylene, monopropylene, hexylene, diethylene, dipropylene, triethylene), glycerin, ketones (acetone, butan-2-one, hexone, sexton, isophorone, diacetone alcohol), esters (ethyl acetate, isopropyl acetate, n-butyl acetate), n-methyl-2-pyrrolidone, γ-butyrolactone and the like.

In one embodiment, a plasticizer may be added to the described composition. Examples of useful plasticizers include abietates, adipates, alkyl pyrrolidones, alkylated caprolactams, benzoates, butyrates, citrates, epoxidized compounds, phthalates, polyester, polyol esters, ricinoleates, sebacates, stearates, and sulphonamides. Additional information regarding plasticizers can be found in the National Printing Ink Research Institute (NPIRI) "Raw Materials Data Handbook" (Volume 2). Specific examples of plasticizers include triethyl citrate, epoxidized soya bean oils, dimethyl phthalate, glyceryl triacetate, butyl ricinoleate, butyl stearate, n-octyl-2-pyrrolidone, n-dodecyl-2-pyrrolidone, n-cocoyl-2-pyrrolidone, n-hydrogenated tallowyl-2-pyrrolidone and the like.

In one embodiment, a wax may be added to the described composition. Examples of useful waxes include polyethylene, polytetrafluoroethylene, fatty acid amides (i.e., stearamide), petroleum (i.e., paraffins, slack, scale, jelly, microcrystalline, ceresin, montan, montan esters), beeswax, carnauba, shellac, Japan, candelilla, lanolin, alkylated polyvinyl pyrrolidones (alkylated with C4, C12, C20, C30, and the like), and the like.

In one embodiment, a drier may be added to the described composition. Examples of useful driers include oil soluble soaps (formed from octoates, resonates, naphthenates, tallates, linoleates), cobalt, cobalt acetate, manganese, cerium, zirconium, lithium, calcium, zinc, lead acetate, manganese borate and the like.

In one embodiment, a chelating agent may be added to the described composition. Examples of useful chelating agents include ethylenediaminetetra-acetic acid and sodium salts, nitrilotriacetic acid salts, sodium salts of diethylenetriamine-acetic acid, heptonates, alkanolamines, dimethyl glyoxime and the like.

In one embodiment, an anti-oxidant may be added to the described composition. Examples of useful anti-oxidants include eugenol, hydroquinone, pyrocatechol, guaiacol, butylated hydroxytoluene, butylated hydroxyanisole, methyl ethyl ketoxime, butylaldoxime, cyclohexanone oxime and the like.

In one embodiment, a surfactant may be added to the described composition. Surfactants can also be employed in the presence of defoaming agents such as polydimethyl siloxanes and derivatives thereof. Examples of useful surfactants include anionic (i.e., alkali metal soaps, ammonium and ammonium salts of long chain fatty acids), cationic (i.e., quaternary fatty ammonium halides, acetates, or suphates), non-ionic (i.e., polyethylene oxide chains attached to hydrocarbons), amphoteric and the like.

In one embodiment, deodorants and fragrances may be added to the described composition. Examples of useful deodorants and fragrances include amyl and methyl salicylate, vanillin, citron, cedarwood, peppermint, lavender, carnation and the like.

In one embodiment, adhesion promoters may be added to the described composition. Examples of useful adhesion promoters include titanium acetyl-acetonate, polyfunctional aziridines, polyethylene imines, chlorinated polyolefins, pentahydroxy(tetradecanoato) di-chromium, octadecanoato chromic chloride hydroxide, glycidoxy (epoxy) functional methoxy silane, β-(3,4-epoxycyclohexyl) ethyltriethoxysilane and the like.

In one embodiment, polymerization inhibitors may be added to the described composition. Examples of useful inhibitors include hydroquinone, hydroquinone monomethyl ether, hydroquinone monopropyl ether, hydroquinone monobenzyl ether, amyl quinine, amyloxyhydroquinone, n-butylphenol, phenol, 4-methoxyphenol (MEHQ), phenothiazine, nitrobenzene and phenolic-thio compounds, alone or in combination thereof.

In one embodiment, laking agents may be added to the described composition. Examples of useful laking agents include tannic acid and derivatives, shellac, maleic acids and the like.

In one embodiment, silica may be added to the described composition. Examples of useful silicas include fumed, precipitated, gel, colloidal and the like.

In one embodiment, a stabilizer may be used to inhibit premature cross-linking of the described composition. Stabilizers are well known in the art, and include, but are not limited to, hydroquinone, hydroquinone monomethyl ether, hydroquinone monopropyl ether, hydroquinone monobenzyl ether, amyl quinine, amyloxyhydroquinone, n-butylphenol, phenol, 4-methoxyphenol (MEHQ), phenothiazine, nitrobenzene and phenolic-thio compounds, alone or in combination thereof.

In one aspect, the described composition may also includes one or more additives in conventional quantities which may provide enhanced or altered properties in the composition. These additives may be selected from but are not limited to slip modifiers, thixotropic agents, laponites, flow or rheology control agents, waxes, UV-light absorbers, stabilizer, fungicides, bactericides, organic/inorganic filler particles (i.e., clays, kaolins), leveling agents, antistatic agents, viscosity modifier, therapeutic and/or preventive medicaments, and other ingredients apparent to those skilled in the art.

In various embodiments, the compositions described herein may contain the described reactive monomer at a concentration range suitable for the particular application, and in general, be present in the composition at a range from about 0.05% to about 40% by weight.

The compositions disclosed herein may be characterized as being conductive, metallic, pearlescent, fluorescent, and/or as exhibiting or having a thermal transition or phase change.

In one embodiment, the compositions may optionally include carbon nanostructures such nano-onions, horns, tubes, rods, wires, cones, dots, whiskers, filaments, nano-diamond, and graphene sheets. In another embodiment, the compositions disclosed herein may optionally include quantum dots.

In one embodiment, a polymerized composition is produced from the reactive solution comprising a polymerizable component by curing through any of the above methods and further formulated as a composition to be employed in various applications such as industrial, personal care, household and pharmaceuticals. Exemplary and non-limiting applications of the proposed compositions are essentially in the field of coating-UV curable, newspaper inks, packaging inks, lithographic inks, offset inks, gravure inks and plates, flexographic inks and plates, screen inks, ink-jet inks, RFID devices, adhesive inter-layers, adhesion promoters, substrate penetrants, varnishes, labels, food wrappers, labels and colors for toys, labels and colors for pencils, labels and colors for comics, inks for postal application, inks for monetary application, inks for official government documents, over print varnish, visual identification, security inks, packaging, shrink wraps, container sleeves, metal inks and coatings, anti-fog surfaces. In various embodiment, the composition is produced as solid, liquid or powder or in a solution form.

The present invention is illustrated in detail by way of the below given examples. The examples are given herein for illustration of the invention and are not intended to be limiting thereof.

Example 1

UV Curing Ink Base

| Material | Supplier | Mass (g) |
|---|---|---|
| N-Vinyl Pyrrolidone | ISP | 9.875 |
| 1-octyl-4-(prop-1-en-2-yl)-IH-1,2,3-triazole | described monomer | 9.875 |
| Irgacure 184 | Ciba | 3.0 |
| PETA-4 (SR 295) | Sartomer | 76.75 |
| Surfactant DC-193 | Dow Corning | 0.5 |
| Total | | 100 |

Example 2

Offset Lithographic Ink

Based on Leach and Pierce's Printing Ink Manual (Kluwer, Boston, 1999) (the contents of which are hereby incorporated by reference) as a guide for the production of a standard dry offset lithographic ink, a modified formulation employing the described monomer was designed and presented below:

| Raw Material | w/w % |
|---|---|
| Pigment | 18.0 |
| Acrylate prepolymer | 30.0 |
| Modifying hard resin | 25.0 |
| 1-octyl-4-(prop-1-en-2-yl)-IH-1,2,3-triazole (described monomer) | 16.0 |
| Photo-initiator and amine synergist | 9.0 |

-continued

| Raw Material | w/w % |
| --- | --- |
| Polyethylene wax | 1.0 |
| Silicone fluid | 1.0 |

U.S. Pat. No. 7,232,851 and WO 2003/014239 (the contents of which are hereby incorporated by reference) may also be used as a guide for the production of a lithographic inks.

Example 3

Flexographic Ink

Based on U.S. Pat. No. 7,291,658 B2 (the contents of which are hereby incorporated by reference) as a guide for the production of a standard white flexographic ink, a modified formulation employing the described monomer was designed and presented below:

| Raw Material | Description | Parts (w/w) |
| --- | --- | --- |
| Pigment | R-706 | 40.0 |
| Ashland D-30R | Ashland resin for grinding pigments | 17.5 |
| Ashland F-126R | Ashland resin | 28.0 |
| 1-octyl-4-(prop-1-en-2-yl)-IH-1,2,3-triazole | described monomer | 10.0 |
| LG-37 | Reactive defoaming agent | 1.0 |
| BYK 019 | Silicone defoamer | 0.5 |
| ViaCure LX | UCB photoinitiator vehicle for light ink applications | 3 |

Example 4

Letterpress Ink

Based on U.S. Pat. No. 6,620,227 (B1) (the contents of which are hereby incorporated by reference) as a guide for the production of a CF (coated front) UV ink, a modified formulation employing the described monomer was designed and presented below:

| Raw Material | Description | Parts (w/w) |
| --- | --- | --- |
| KC 98-1410 UV from Kohl & Madden Ink | UV curable ink base | 25.17 |
| Bis-(3-allyl-4-hydroxy phenyl) sulfone | Acidic color developer | 50.34 |
| 1-octyl-4-(prop-1-en-2-yl)-IH-1,2,3-triazole | described monomer and reactive solvent | 23.49 |
| Darocure 4265 from Ciba | Photo-initiator | 1.00 |

Example 5

Screen Printing Ink

Based on U.S. Pat. No. 7,291,658 B2 (the contents of which are hereby incorporated by reference) as a guide for the production of a standard white screen-ink, a modified formulation employing the described monomer was designed and presented below:

| Raw Material | Description | Parts (w/w) |
| --- | --- | --- |
| Pigment | R-706 | 41.2 |
| ViaScreen 515 | UCB Vehicle for screen printing applications | 30.1 |
| Ebecryl 110 | 2-Phenoxyethyl acrylate | 18.8 |
| 1-octyl-4-(prop-1-en-2-yl)-IH-1,2,3-triazole | described monomer | 7.21 |
| LG-37 | Reactive defoaming agent | 1.0 |
| BYK 019 | Silicone defoamer | 0.5 |
| ViaCure LX | UCB photoinitiator vehicle for ink applications | 6 |

Additional teachings can be found in U.S. Pat. No. 5,395,863 (the contents of which are hereby incorporated by reference).

Example 6

Screen Printing Ink

Based on U.S. Pat. No. 4,418,138 A (the contents of which are hereby incorporated by reference) as a guide for the production of a standard black screen-ink, a modified formulation employing the described monomer was designed and presented below:

| Raw Material | Parts (w/w) |
| --- | --- |
| Catofor 06 | 1.0 |
| 2-(carboxymethoxy)thioxanthone | 0.5 |
| Ethanol | 5.0 |
| Polyethylene glycol 200 diacrylate | 10.5 |
| 1-octyl-4-(prop-1-en-2-yl)-IH-1,2,3-triazole (described monomer) | 4.5 |
| Uvecryl P101 | 2.0 |
| 20% Gohsenol KP08 solution | 50.0 |
| Anthrasol Blu-Black 1RD | 0.5 |
| Polyethylene glycol 200 | 1.0 |

Example 7

Ink-Jet Printing Ink

Based on WO 2007/036692 (A1) (the contents of which are hereby incorporated by reference) as a guide for the production of a standard UV inkjet ink, a modified formulation employing the inventive monomer was designed and presented below:

| Raw Material | Description | Parts (w/w) |
| --- | --- | --- |
| Polyethylene glycol 200 diacrylate | oligomer | 9 |
| Ethoxylated (20) trimethylolpropane triacrylate | monomer | 4.5 |
| 1-octyl-4-(prop-1-en-2-yl)-IH-1,2,3-triazole | described monomer | 24.8 |
| Water | | 44.9 |
| Cab-O-Jet 300 | Carbon black pigment with carboxylate surface treatment for water application | 12.5 |
| Irgacure 2959 | Photo-initiator | 4 |
| FC4430 | fluorosurfactant | 0.2 |

Example 8

Electrophotographic Printing Ink

Based on U.S. Pat. No. 5,332,644 A (the contents of which are hereby incorporated by reference) as a guide for the production of a standard electrophotographic coating, a modified formulation employing the described monomer was designed and presented below.

| Raw Material | Parts (w/w) |
| --- | --- |
| Benzimidazole perylene (BZP) | 9.25 |
| 1-octyl-4-(prop-1-en-2-yl)-IH-1,2,3-triazole (described monomer) | 36.3 |
| Styrene | 54.45 |

Example 9

Intaglio Printing Ink

Based on U.S. Pat. No. 6,787,583 (B2) (the contents of which are hereby incorporated by reference) as a guide for the production of a intaglio UV ink, a modified formulation employing the described monomer was designed and presented below:

| Raw Material | Parts (w/w) |
| --- | --- |
| Ebecryl 2002 | 46.6 |
| Montan Wax | 4.0 |
| 1-octyl-4-(prop-1-en-2-yl)-IH-1,2,3-triazole (described monomer) | 1.5 |
| Emulsifier | 1.5 |
| UV Stabilizer | 2.0 |
| Igraliet Red 8B | 8.0 |
| $CaCO_3$ | 30.0 |
| Esacure ITX | 2.6 |
| Irgacure 369 | 3.8 |

Example 10

Printing Plate

Based on U.S. Pat. No. 4,011,084 (A) (the contents of which are hereby incorporated by reference) as a guide for the production of a UV curable printing plate, a modified formulation employing the described monomer was designed and presented below:

| Raw Material | Parts (w/w) |
| --- | --- |
| Polyurethane/ester diacrylate | 75 |
| 1-octyl-4-(prop-1-en-2-yl)-IH-1,2,3-triazole (described monomer) | 25 |
| Benzoin methyl ether | 1 |
| Potassium salt of N-nitrosocyclohexylhydroxylamine | 0.05 |

While the foregoing written description of the invention enables one of ordinary skill to make and use the described composition, those of ordinary skill will understand and appreciate the existence of variations, combinations, and equivalents of the specific embodiment, method, and examples herein. The invention should therefore not be limited by the above described embodiment, method, and examples.

What is claimed is:

1. A composition comprising at least one reactive monomer, wherein said reactive monomer is a functionalized 4- or 5-vinyl substituted regioisomer of 1,2,3-triazole, and wherein the composition is a lithographic ink, a flexographic ink, a gravure ink, a letterpress ink, a screening printing ink, an ink-jet printing ink, an electrophotographic ink, an intaglio printing ink, or a collotype printing ink.

2. The composition according to claim 1, wherein the composition is a reactive solution or a reactive coating.

3. The composition according to claim 1, wherein the reactive monomer is selected from the group consisting of 1-octyl-4-(prop-1-en-2-yl)-IH-1,2,3-triazole,

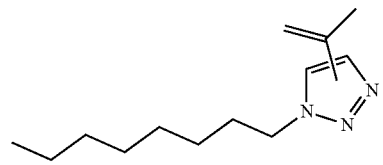

N,N-dimethyl-2-(1H-1,2,3-triazol-1-yl)ethanamine with a 2-methylprop-1-ene,

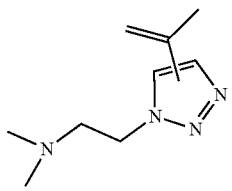

and combinations thereof.

4. The composition according to claim 1, wherein the coating is a UV curable coating, a printing ink, or a UV printing ink.

5. The composition according to claim 1, wherein the coating is conductive.

6. The composition according to claim 1, wherein the coating is applied to at least one of metal, plastic, glass, or textile.

7. The composition according to claim 1, wherein the metal is selected from the group consisting of steel, iron, copper, brass, gold, silver, and aluminum.

8. The composition according to claim 1, wherein the plastic is selected from the group consisting of vinyl, polyolefin, non-woven spunbond olefin fiber, polyester, polyvinylidene chloride, and nylon.

9. The composition according to claim 1, further comprising a fragrance, an anionic initiator, a cationic initiator, a free radical initiator, a metal, a carbon pigment, a carbon nanotube, a graphene sheet, or a quantum dot.

10. The composition according to claim 1, wherein the composition is pearlescent.

11. The composition according to claim 1, wherein the composition exhibits a thermal transition or phase change.

12. The composition according to claim 1, wherein the composition is fluorescent.

* * * * *